United States Patent
Morrison et al.

(10) Patent No.: US 9,912,103 B2
(45) Date of Patent: Mar. 6, 2018

(54) SYSTEM AND METHOD FOR UTILIZING SMART DATA CONNECTORS WITH BUILT IN SAFELY REMOVE HARDWARE FUNCTIONALITY

(71) Applicant: DELL PRODUCTS, LP, Round Rock, TX (US)

(72) Inventors: Jason S. Morrison, Cedar Park, TX (US); Laurent A. Regimbal, Round Rock, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 117 days.

(21) Appl. No.: 15/091,159

(22) Filed: Apr. 5, 2016

(65) Prior Publication Data
US 2017/0288340 A1    Oct. 5, 2017

(51) Int. Cl.
| | |
|---|---|
| G06F 13/20 | (2006.01) |
| H01R 13/633 | (2006.01) |
| H01R 13/627 | (2006.01) |
| H01R 13/717 | (2006.01) |
| G06F 13/42 | (2006.01) |

(52) U.S. Cl.
CPC ....... *H01R 13/633* (2013.01); *G06F 13/4282* (2013.01); *H01R 13/627* (2013.01); *H01R 13/7175* (2013.01)

(58) Field of Classification Search
CPC .......... H01R 13/633; H01R 13/7175; H01R 13/627; G06F 13/4282
See application file for complete search history.

(56) References Cited

U.S. PATENT DOCUMENTS

| | | | |
|---|---|---|---|
| 6,779,943 B2 | 8/2004 | Shoen | |
| 9,640,906 B2 * | 5/2017 | Wojcik | H01R 13/6271 |
| 2008/0139038 A1 * | 6/2008 | Lee | H01R 13/633 439/382 |
| 2011/0147174 A1 * | 6/2011 | Chuang | H01R 13/6275 200/51.09 |
| 2012/0273638 A1 | 11/2012 | Sun | |
| 2013/0117488 A1 * | 5/2013 | Perry | G06F 13/4081 710/304 |
| 2013/0261800 A1 * | 10/2013 | Makley | A44B 11/005 700/275 |
| 2013/0325183 A1 * | 12/2013 | Rahilly | E05B 65/46 700/275 |
| 2014/0118921 A1 | 5/2014 | Lin | |
| 2014/0153181 A1 | 6/2014 | Peng et al. | |

* cited by examiner

*Primary Examiner* — Jing-Yih Shyu

(57) ABSTRACT

An information handling system includes a processor and receptacle module. The processor to receive a request to safely remove a hardware component coupled to the information handling system, to execute a safely remove process, and to send a latch release signal in response to the process being completed. The receptacle module including a receptacle, a latch, and a component. The latch is biased in a first position with a hook of the latch being located within a notch of the receptacle. The latch to rotate from the first position to a second position in response to a plug being inserted into the receptacle, and to snap back to the first position in response to the plug being fully inserted into the receptacle. The component to continually exert a first force on the latch to move the latch to the second position while the latch release signal is received.

20 Claims, 5 Drawing Sheets

SYSTEM AND METHOD FOR UTILIZING SMART DATA CONNECTORS WITH BUILT IN SAFELY REMOVE HARDWARE FUNCTIONALITY

FIELD OF THE DISCLOSURE

This disclosure generally relates to information handling systems, and more particularly relates to smart data connectors with built in safely remove hardware functionality.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

SUMMARY

An information handling system includes a processor and a receptacle module. The processor is to receive a request to safely remove a hardware component coupled to the information handling system, to execute a safely remove process for the hardware component, and to send a latch release signal in response to the safely remove hardware process being completed. The receptacle module includes a receptacle mounted on a receptacle circuit board, a latch, and a component. The latch is biased in a first position with a hook of the latch being located in a notch of the receptacle. The latch is configured to rotate from the first position to a second position in response to a plug being inserted into the receptacle, and to snap back to the first position in response to the plug being fully inserted into the receptacle. The component is configured to receive the latch release signal from the processor, and to continually exert a first force on the latch to move the latch to the second position while the latch release signal is received.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
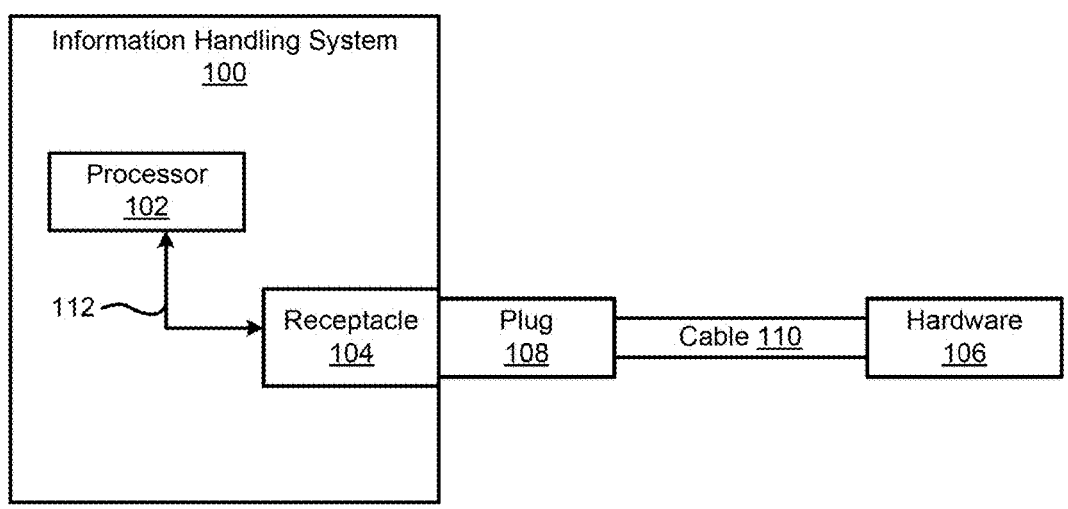
FIG. 1 is a block diagram of an information handling system in accordance with at least one embodiment of the present disclosure.

FIG. 1 illustrates an information handling system 100. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

The information handling system 100 includes a processor 102 and a receptacle 104. The information handling system 100 can be placed in communication with a hardware component 106 in response to a plug 108 being inserted into the receptacle 104. In an embodiment, the receptacle can be a type-C universal serial bus (USB) receptacle, and the plug can be a type-C USB plug. The processor 102 is in communication with the receptacle 104 via data communication buses 112. The receptacle 104 is in communication with the plug 108 via data communication ports of the receptacle.

The plug 108 is coupled to a hardware component 106 via a communication cable 110. In an embodiment, the hardware component 106 can be any type of external component, such as a memory device, a compact disk drive, or the like. In an embodiment, the receptacle 104 can be a receptacle component that will be described in greater detail with respect to FIG. 2 below.

Figure 2:
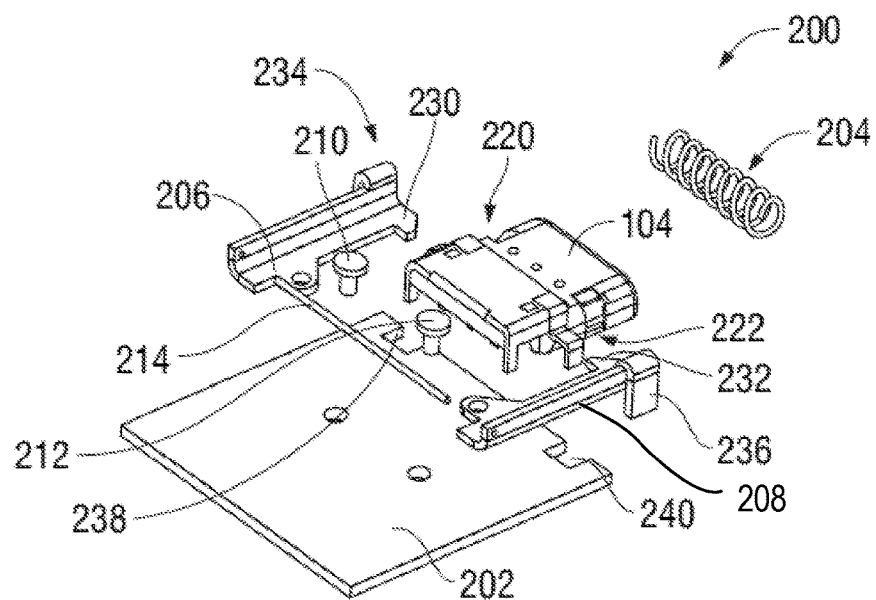
FIG. 2 is a perspective view of a receptacle of the information handling system in accordance with at least one embodiment of the present disclosure.

FIG. 2 shows an exploded view of a receptacle component 200 in accordance with at least one embodiment of the present disclosure. The receptacle component 200 includes the receptacle 104, a receptacle circuit board 202, a spring 204, latches 206 and 208, pins 210 and 212, and a wire 214. The receptacle 104 includes notches 220 and 222. The latch 206 includes a hook 230 and a post 234. The latch 208 includes a hook 232 and a post 236. The receptacle circuit board 202 includes notches 238 and 240.

The receptacle 104 can be mounted on the receptacle circuit board 202, and data communication ports of the receptacle can be electrically coupled to data communication buses on the receptacle circuit board, such as communication buses 112 of FIG. 1. The data communication buses of receptacle circuit board 202 can provide communication between receptacle 104 and the processor 102 of FIG. 1. The latches 206 and 208 can be place in physical communication with the receptacle circuit board 202, such that the post 234 of latch 206 is located within notch 238 of the receptacle circuit board, and that the post 236 of latch 208 is located within notch 240. Pin 210 can hold latch 206 in physical communication with the receptacle circuit board 202 while allowing the latch to rotate, such that the post 234 can move from an inner most edge of the notch 238 to an outer most edge of the notch. Similarly, pin 212 can hold latch 208 in physical communication with the receptacle circuit board 202 while allowing the latch to rotate, such that the post 236 can move from an inner most edge of the notch 240 to an outer most edge of the notch.

The spring 204 is connected between the posts 234 and 236, and held in compression to bias the post 234 to the inner most edge of notch 238 and the post 236 to the inner most edge of notch 240. Thus, spring 204 can also bias hook 230 of latch 206 to be inserted within notch 220 of the receptacle 104, and can bias hook 232 of latch 208 to be inserted within notch 222 of the receptacle. The wire 214 can be connected between the latches 206 and 208 as shown in FIG. 3.

Figure 3:
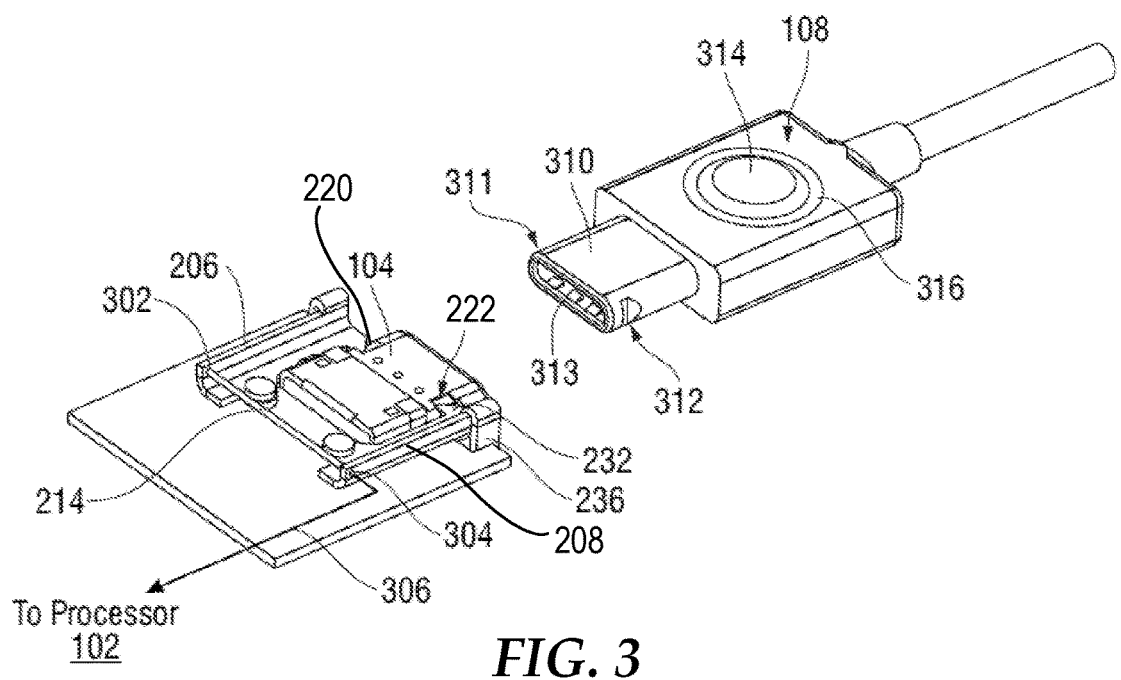
FIG. 3 is a perspective view of the receptacle and a plug of the information handling system in a first connection stage in accordance with at least one embodiment of the present disclosure.

FIG. 3 shows the receptacle 104 and the plug 108 in a first connection stage in accordance with at least one embodiment of the present disclosure. Latch 206 includes a connection point 302 that is connected to a first end of the wire 214. Latch 208 includes a connection point 304 that is connected to a second end of the wire 214, and a wire 306 coupled to the processor 102 of FIG. 1. In an embodiment, the connection points 302 and 304 are electrically insulated from the latches 206 and 208, such that any voltage provided to the wire 214 via the wire 306 is not also provided to latches 206 and 208 via the wire 214.

Figure 4:
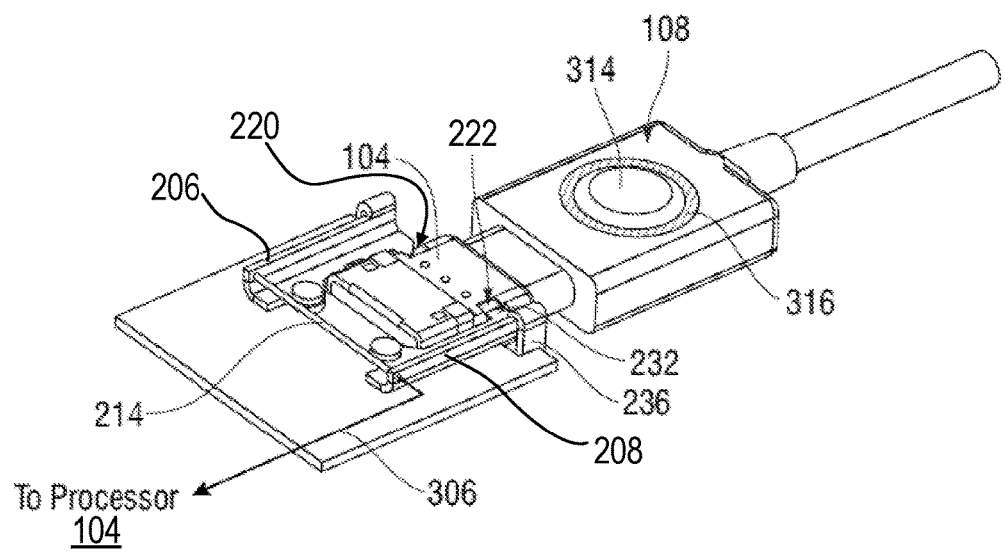
FIG. 4 is a perspective view of the receptacle and the plug in a second connection stage in accordance with at least one embodiment of the present disclosure.

The plug 108 includes a tip 310, which in turn includes notches 311 and 312, and data communication pins 313. The plug also includes a button 314 and a light emitting diode (LED) 316. In an embodiment, the LED 316 can change colors depending on different states of the communication between the receptacle 104 and the plug 108. For example, LED 316 can be illuminated white/not illuminated, be illuminated red, be illuminated green, or the like. As the tip 310 of the plug 108 is inserted within the receptacle 104, latches 206 and 208 can be pushed out of the way of the tip. In particular, the first portion of the tip 310 can push the hooks 230 and 232 out of notches 220 and 222, such that post 234 is located at the outer most edge of notch 238 and post 236 is located at the outer most edge of notch 240. When the tip 310 of the plug 108 is fully inserted into the receptacle 104, the spring 204 exerts a force on the latches 206 and 208 that causes hook 230 of latch 206 to snap within notch 311 and hook 232 of latch 208 to snap within notch 312 as shown in FIG. 4. In an embodiment, if a connector plug with a tip that does not include notches 311 and 312, the hooks 230 and 232 can remain out of notches 220 and 222 while the tip is connected to receptacle 104, such that post 234 is located at the outer most edge of notch 238 and post 236 is located at the outer most edge of notch 240 while the tip is connected to receptacle 104. However, in this embodiment, the connector plug without notches in the tip would not prevent a user from removing the connector plug prior to the safely remove hardware sequence being performed.

FIG. 4 shows the receptacle 104 and the plug 108 in a second connection stage in accordance with at least one embodiment of the present disclosure. In an embodiment, the second connection stage is the plug 108 being fully inserted into the receptacle 104 and the latches 206 and 208 in the biased position, such that the hook 230 is within notch 311 and hook 232 in within notch 312. Similarly, the post 234 of latch 206 is located at the inner most edge of notch 238, and the post 236 of latch 208 is located at the inner most edge of notch 240. Upon the plug 108 being fully inserted into the receptacle 104, the hardware component 106 can then be placed in communication with the processor 102 of the information handling system 100. In an embodiment, the plug 108 can be inserted within a receptacle that does not include the hooks 230 and 232. In this embodiment, the plug 108 can be inserted within the receptacle without being locked in place, and the button 314 can still operate as described below.

If a user wants to disconnect the hardware module 106 from the information handling system 100, the user can press button 314 to initiate the removal process. When the button 314 has been pressed, the LED 316 is illuminated a first color, such as red, to indicate that the hardware component 106, of FIG. 1, is not ready to be removed from the information handling system 100. Also, when the button 314 is pressed, a request to safely remove the hardware component 106, of FIG. 1, can be sent to the processor 102. The request to safely remove the hardware component 106 can be sent to the processor 102 of the information handling system 100 via the communication pins 313, a data communication port of the receptacle 104, and the data communication bus 112 of FIG. 1. In an embodiment, the request to safely remove the hardware includes identification of the hardware component 106 connected to the plug 108. The processor 102 can then execute a safely remove hardware process after receiving the request to safely remove the hardware. In an embodiment, the request to safely remove the hardware component 106 can be initiated via a user selecting a soft button on a graphical user interface. In this embodiment, the request to safely remove the hardware component 106 can still cause the LED to illuminate to a first color to indicate that the hardware component 106, of FIG. 1, is not ready to be removed from the information handling system 100.

Figure 5:
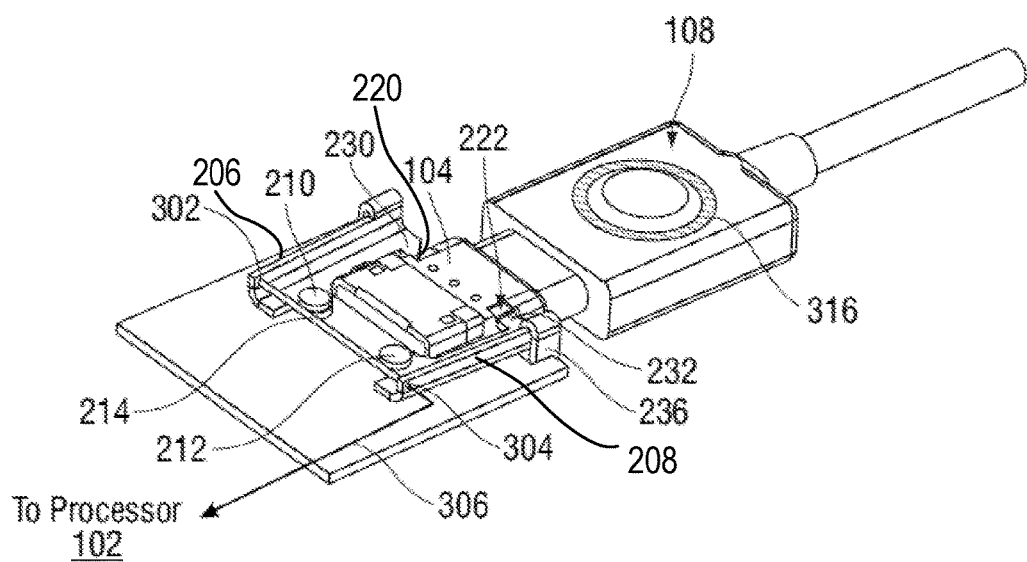
FIG. 5 is a perspective view of the receptacle and the plug in a third connection stage in accordance with at least one embodiment of the present disclosure.

FIG. 5 shows the receptacle 104 and the plug 108 in a third connection stage in accordance with at least one embodiment of the present disclosure. In an embodiment, the third connection stage can be that the latches 206 and 208 have removed hooks 230 and 232 from notches 311 and 312 of the plug 108 so that the hardware component 106 may be removed from the information handling system 100.

Upon the safely remove hardware process being completed, the processor 102 can send a latch release signal to the receptacle 104. In an embodiment, the processor 102 can send the latch release signal by providing a voltage to the wire 214 via wire 306. This voltage can induce a current across the wire 214, which can cause the wire to compress. In an embodiment, wire 214 can be any type of wire that compressed when a current is applied to the wire, such as musclewire or the like.

The wire 214 can then exert a force on the latch 206 at connection point 302, and can exert a force on latch 208 at connection point 304. The force exerted by the wire 214 can be greater that the force exerted by spring 204, such that latches 206 can rotate from a closed position to an open position. In an embodiment, the hooks 230 and 232 are located within the notches 220 and 222 of the receptacle 104 while the latches 206 and 208 are in the closed position. Alternatively, the hooks 230 and 232 are not located within the notches 220 and 222 of the receptacle 104 while the latches 206 and 208 are in the open position. In an embodiment, the latch release signal is continually sent to the wire 214 until a determination is made that the plug 108 has been removed. In an embodiment, any other type of component, such as motors, can be used to make the latches 206 and 208 rotate from the closed position to the open position without varying from the scope of this disclosure.

The processor 102 can then wait for a specific amount of time to expire since the processor sent the latch release signal. In an embodiment, the specific amount of time is the amount of time to rotate the latches 206 and 208 from the closed position to the open position. In response to the specific amount of time expiring, the processor 102 can send a signal to plug 108 to indicate that the safely remove hardware process has been completed. The plug 108 can then change the color of the LED 316 to a second color, such as green, to indicate to a user that the hardware component 106 can be safely removed from the information handling system. In an embodiment, the signal can be sent from processor 102 to the plug 108 via the data communication bus 112, a data communication port of the receptacle 104, and the communication pins 313. A user can then unplug the plug 108 from the receptacle 104, and the processor 102 can stop providing the latch release signal to the wire 214, such that the latches 206 and 208 can rotate to the closed position.

Figure 6:
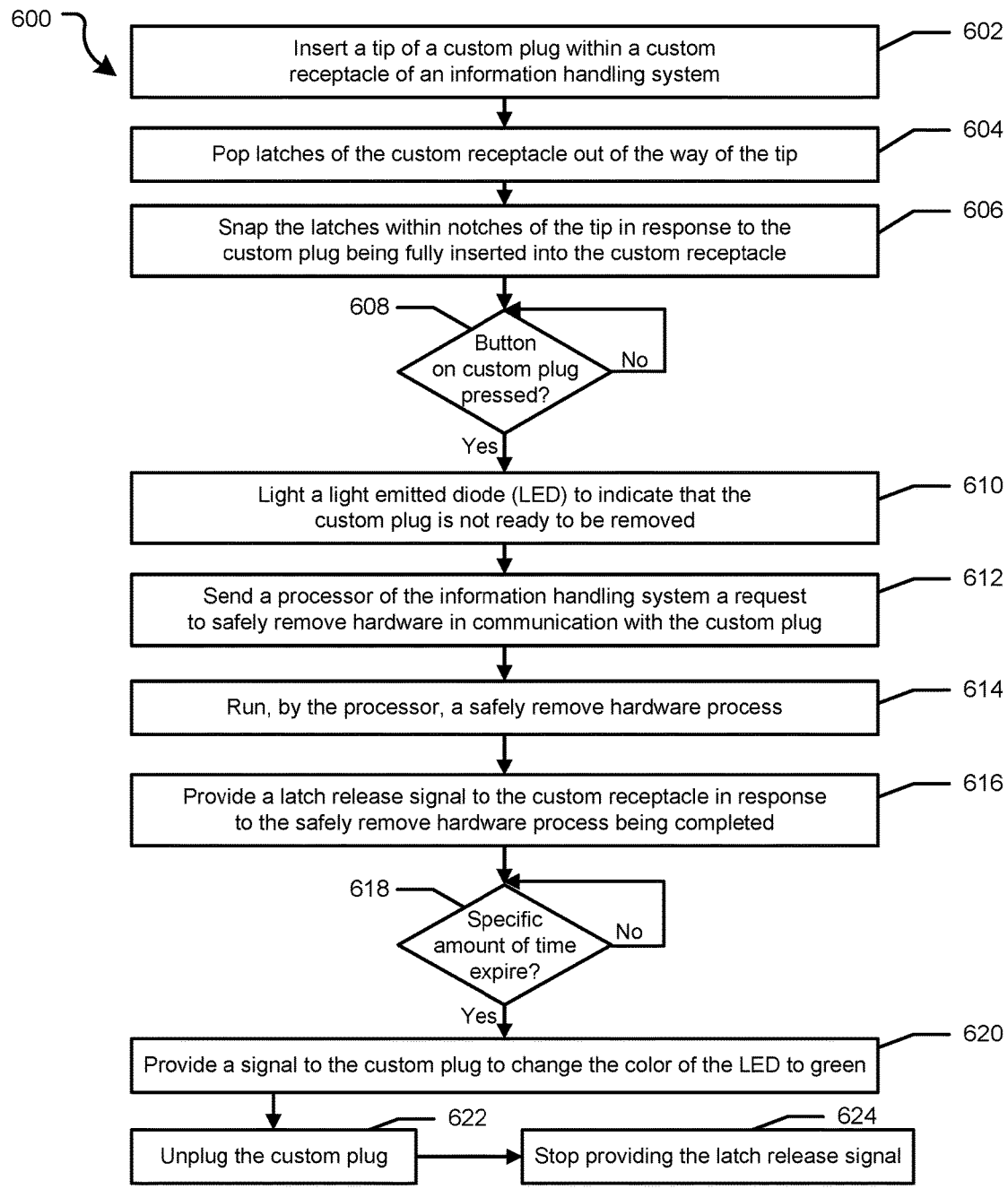
FIG. 6 is a flow diagram of a method for connecting and removing the plug from the receptacle in accordance with at least one embodiment of the present disclosure.

FIG. 6 shows a method 600 for connecting and removing the custom plug 108 from the receptacle component 200 of the information handling system 100 in accordance with at least one embodiment of the present disclosure. At block 602, a tip of the custom plug is inserted within the receptacle component of the information handling system. As the tip of the custom plug is being inserted into the receptacle component, latches of the receptacle component pop out of the way at block 604. At block 606, the latches snap within notches of the tip of the custom plug in response to the custom plug being fully inserted into the receptacle component. In an embodiment, the custom plug can be connected to hardware component, such as a memory device, a compact disk drive, or the like. The hardware component can then be placed in communication with the information handling system in response to the custom plug being fully inserted within the receptacle component.

At block 608, a determination is made whether a button on the custom plug is pressed. When the button has been pressed, a light emitting diode (LED) is lit a first color to indicate that the custom plug is not ready to be removed at block 610. In an embodiment, the first color can be red. At block 612, a processor of the information handling system is sent a request to safely remove the hardware component in communication with the custom plug. In an embodiment, the request can be sent from the custom plug to the processor via a data communication port of the receptacle component. In an embodiment, the request to safely remove the hardware includes identification of the hardware component connected to the custom plug. The processor runs a safely remove hardware process at block 614.

At block 616, a latch release signal is sent to the receptacle component in response to the safely remove hardware process being completed. In an embodiment, the processor can send the latch release signal by providing a voltage to one or more components of the receptacle component, which can cause the components to release the latches. For example, the processor can send a voltage to muscle wire connected between two latches of the receptacle component, and the voltage can cause the muscle wire to compress. The compressed muscle wire can cause the latches to disengage with the tip of the custom plug. In an embodiment, the latch release signal is continually sent to the receptacle component until a determination is made that the custom plug has been removed.

At block 618, a determination is made whether a specific amount of time has expired since the processor sent the latch release signal. In an embodiment, the specific amount of time is waited after sending the latch release signal to ensure that the latches have been released before a user tries to unplug the custom plug. In response to the specific amount of time expiring, a signal is provided to the custom plug to change the color of the LED to a second color at block 620. In an embodiment, the second color can be green. In an embodiment, the signal can be sent from processor to the custom plug via a data communication port of the receptacle component. At block 622, the custom plug is unplugged from the receptacle component. The latch release signal is no longer sent to the receptacle component after the custom plug is removed at block 624.

Figure 7:
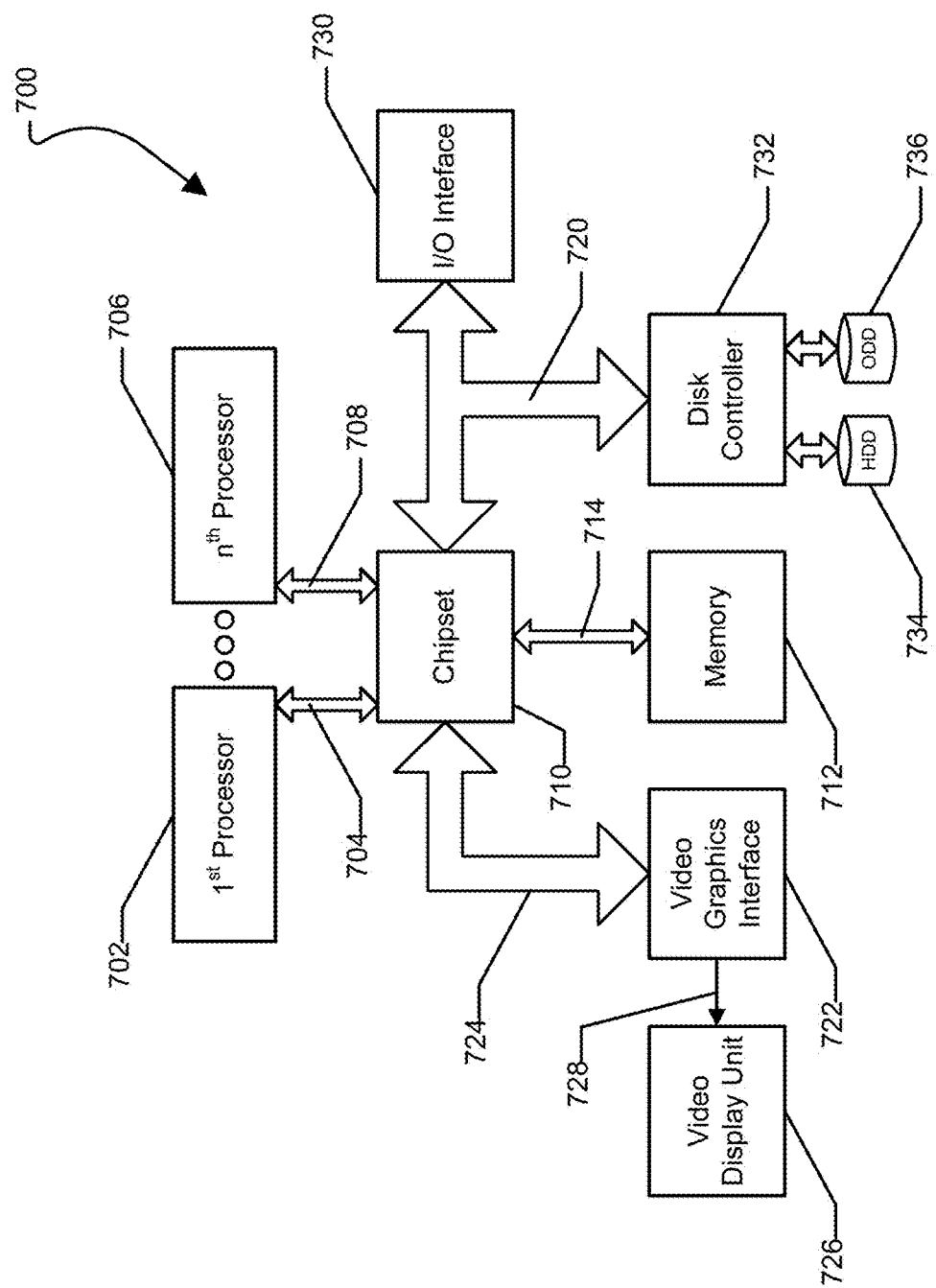
FIG. 7 is a block diagram of a general information handling system.

As shown in FIG. 7, an information handling system 700, such as the information handling system 100, can include a first physical processor 702 coupled to a first host bus 704 and can further include additional processors generally designated as $n^{th}$ physical processor 706 coupled to a second host bus 708. The first physical processor 702 can be coupled to a chipset 710 via the first host bus 704. Further, the $n^{th}$ physical processor 706 can be coupled to the chipset 710 via the second host bus 708. The chipset 710 can support multiple processors and can allow for simultaneous processing of multiple processors and support the exchange of information within information handling system 700 during multiple processing operations.

According to one aspect, the chipset 710 can be referred to as a memory hub or a memory controller. For example, the chipset 710 can include an Accelerated Hub Architecture (AHA) that uses a dedicated bus to transfer data between first physical processor 702 and the $n^{th}$ physical processor 706. For example, the chipset 710, including an AHA enabled-chipset, can include a memory controller hub and an input/output (I/O) controller hub. As a memory controller hub, the chipset 710 can function to provide access to first physical processor 702 using first bus 704 and $n^{th}$ physical processor 706 using the second host bus 708. The chipset 710 can also provide a memory interface for accessing memory 712 using a memory bus 714. In a particular embodiment, the buses 704, 708, and 714 can be individual buses or part of the same bus. The chipset 710 can also provide bus control and can handle transfers between the buses 704, 708, and 714.

According to another aspect, the chipset 710 can be generally considered an application specific chipset that provides connectivity to various buses, and integrates other system functions. For example, the chipset 710 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 710. The chipset 710 can also be packaged as an application specific integrated circuit (ASIC).

The information handling system 700 can also include a video graphics interface 722 that can be coupled to the chipset 710 using a third host bus 724. In one form, the video graphics interface 722 can be an Accelerated Graphics Port (AGP) interface to display content within a video display unit 726. Other graphics interfaces may also be used. The video graphics interface 722 can provide a video display output 728 to the video display unit 726. The video display unit 726 can include one or more types of video displays such as a flat panel display (FPD) or other type of display device.

The information handling system 700 can also include an I/O interface 730 that can be connected via an I/O bus 720 to the chipset 710. The I/O interface 730 and I/O bus 720 can include industry standard buses or proprietary buses and respective interfaces or controllers. For example, the I/O bus 720 can also include a Peripheral Component Interconnect (PCI) bus or a high speed PCI-Express bus. In one embodiment, a PCI bus can be operated at approximately 33 MHz and a PCI-Express bus can be operated at more than one speed, such as 2.5 GHz, 5 GHz, 8 GHz, and 16 GHz. PCI buses and PCI-Express buses can be provided to comply with industry standards for connecting and communicating between various PCI-enabled hardware devices. Other buses can also be provided in association with, or independent of, the I/O bus 720 including, but not limited to, industry standard buses or proprietary buses, such as Industry Standard Architecture (ISA), Small Computer Serial Interface (SCSI), Inter-Integrated Circuit (I²C), System Packet Interface (SPI), or Universal Serial buses (USBs).

In an alternate embodiment, the chipset 710 can be a chipset employing a Northbridge/Southbridge chipset configuration (not illustrated). For example, a Northbridge portion of the chipset 710 can communicate with the first physical processor 702 and can control interaction with the memory 712, the I/O bus 720 that can be operable as a PCI bus, and activities for the video graphics interface 722. The Northbridge portion can also communicate with the first physical processor 702 using first bus 704 and the second bus 708 coupled to the n$^{th}$ physical processor 706. The chipset 710 can also include a Southbridge portion (not illustrated) of the chipset 710 and can handle I/O functions of the chipset 710. The Southbridge portion can manage the basic forms of I/O such as Universal Serial Bus (USB), serial I/O, audio outputs, Integrated Drive Electronics (IDE), and ISA I/O for the information handling system 700.

The information handling system 700 can further include a disk controller 732 coupled to the I/O bus 720, and connecting one or more internal disk drives such as a hard disk drive (HDD) 734 and an optical disk drive (ODD) 736 such as a Read/Write Compact Disk (R/W CD), a Read/Write Digital Video Disk (R/W DVD), a Read/Write mini-Digital Video Disk (R/W mini-DVD), or other type of optical disk drive.

Although only a few exemplary embodiments have been described in detail in the exemplary embodiments without materially departing from the novel teachings and advantages of the embodiments of the present disclosure. For example, the methods described in the present disclosure can be stored as instructions in a computer readable medium to cause a processor, such as chipset 710, to perform the method. Additionally, the methods described in the present disclosure can be stored as instructions in a non-transitory computer readable medium, such as a hard disk drive, a solid state drive, a flash memory, and the like. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
    popping a latch, of a receptacle of an information handling system, out from a first position to a second position in response to a plug being inserted into the receptacle;
    snap fitting the latch onto the plug in response to the plug being fully inserted into the receptacle, wherein the latch in placed in the first position when the latch is snap fitted onto the plug;
    receiving a request to safely remove a hardware component coupled to the plug;
    sending a first signal to illuminate a light emitting diode of the plug with a first color in response to the request to safely remove the hardware component being received, wherein the first color indicates that the plug is not ready to be removed;
    executing, at a processor of the information handling system, a safely remove process for the hardware component;
    sending a latch release signal to the receptacle in response to the safely remove hardware process being completed;
    releasing the latch in response to the latch release signal; and
    sending a second signal to illuminate the light emitting diode of the plug with a second color in response to a specific amount of time expiring after the latch release signal is sent, wherein the second color indicates that the plug is ready to be removed.

2. The method of claim 1 wherein sending the latch release signal comprises:
    providing a voltage to a component coupled to the latch.

3. The method of claim 2 wherein releasing the latch comprises:
    moving, by the component, the latch from the first position to the second position to cause the latch to no longer be snap fitted onto the plug.

4. The method of claim 1 wherein the latch is snap fitted into a notch of the plug.

5. The method of claim 1 further comprising:
    continually sending the latch release signal until a determination is made that the plug has been removed.

6. The method of claim 1 wherein the request to safely remove the hardware component is received in response to a button on the plug being pressed.

7. The method of claim 1 wherein the request to safely remove a hardware component is received via a data communication port of the receptacle.

8. An information handling system comprising:
a processor to receive a request to safely remove a hardware component coupled to the information handling system, to execute a safely remove process for the hardware component, and to send a latch release signal in response to the safely remove hardware process being completed; and
a receptacle module in communication with the processor, the receptacle module including:
a receptacle circuit board;
a receptacle mounted on the receptacle circuit board, the receptacle having a first notch;
a latch in physical communication with the receptacle circuit board, the latch including a hook, wherein the latch is biased in a first position with the hook being located in first notch of the receptacle, the latch to rotate from the first position to a second position in response to a plug being inserted into the receptacle, and to snap back to the first position in response to the plug being fully inserted into the receptacle; and
a component in physical communication with the latch, the component to receive the latch release signal from the processor, and to continually exert a first force on the latch to move the latch to the second position while the latch release signal is received.

9. The information handling system of claim 8 further comprising:
a spring to exert a second force on the latch to bias the latch in a first position when a plug is not in the receptacle and when the plug is fully inserted in the receptacle.

10. The information handling system of claim 8 wherein the first force exerted by the component is greater than the second force exerted by the spring.

11. The information handling system of claim 8 wherein the component is a wire that compresses in response to a current flowing through the wire.

12. The information handling system of claim 8 wherein the component is electrically insulated from the latch.

13. The information handling system of claim 8, wherein a light emitting diode of the plug is illuminated a first color in response to the request to safely remove the hardware component being sent to the processor, wherein the first color indicates that the plug is not ready to be removed.

14. The information handling system of claim 8 wherein the receptacle is a type-C universal serial bus receptacle.

15. A plug for a hardware component, the plug comprising:
a tip including a notch and data communication pins, the notch to receive a hook of a latch in response to the tip to be inserted within a receptacle of an information handling system;
a button in communication with the data communication pins, the button to provide a request to safely remove the hardware component from an information handling system in response to the button being pressed; and
a light emitting diode in communication with the button and with the data communication pins, the light emitting diode to illuminate a first color in response to the button being pressed, and to illuminate a second color in response to a signal indicating that the hardware component can be safely removed from the information handling system.

16. The plug of claim 15 wherein the request to safely remove the hardware component is provided to a processor of an information handling system via the data communication pins.

17. The plug of claim 15 wherein the first color indicates that the hardware component cannot be safely removed from the information handling system.

18. The plug of claim 15 wherein the second color indicates that the hardware component can be safely removed from the information handling system.

19. The plug of claim 15 wherein the hook is no longer located within the notch of the tip when the hardware component can be safely removed from the information handling system.

20. The plug of claim 15 wherein the plug is a type-C universal serial bus plug.

* * * * *